US 11,208,234 B2

(12) United States Patent
Oerding (10) Patent No.: US 11,208,234 B2
(45) Date of Patent: Dec. 28, 2021

(54) DRINKING BOTTLE AND VALVE THEREFOR

(71) Applicant: Maura Oerding, Berlin (DE)

(72) Inventor: Maura Oerding, Berlin (DE)

(*) Notice: Subject to any disclaimer, the term of this patent is extended or adjusted under 35 U.S.C. 154(b) by 55 days.

(21) Appl. No.: 16/637,682

(22) PCT Filed: Aug. 9, 2018

(86) PCT No.: PCT/EP2018/071645
§ 371 (c)(1),
(2) Date: Feb. 7, 2020

(87) PCT Pub. No.: WO2019/030333
PCT Pub. Date: Feb. 14, 2019

(65) Prior Publication Data
US 2020/0198833 A1    Jun. 25, 2020

(30) Foreign Application Priority Data

Aug. 10, 2017  (DE) ..................... 10 2017 213 976.5

(51) Int. Cl.
| | |
|---|---|
| *B65D 8/00* | (2006.01) |
| *A45F 3/18* | (2006.01) |
| *B65D 47/06* | (2006.01) |
| *B65D 47/20* | (2006.01) |
| *F16K 1/12* | (2006.01) |

(52) U.S. Cl.
CPC ................ *B65D 11/04* (2013.01); *A45F 3/18* (2013.01); *B65D 47/06* (2013.01); *B65D 47/2081* (2013.01); *F16K 1/123* (2013.01)

(58) Field of Classification Search
CPC ...... B65D 21/0209; B65D 21/02; B65D 1/04; B65D 11/04; B65D 11/02; B65D 47/06; B65D 47/04; B65D 47/2081; B65D 47/2056; A45F 3/18; A45F 3/16; F16K 1/123; B05B 11/0081
USPC .................. 215/6, 382; 220/4.27, 4.26, 501; 222/145.1, 145.5, 129
See application file for complete search history.

(56) References Cited

U.S. PATENT DOCUMENTS

| | | |
|---|---|---|
| 4,813,556 A | 3/1989 | Lawrence |
| 2003/0205548 A1 | 11/2003 | Seckler |
| 2012/0132680 A1 | 5/2012 | Chen |

(Continued)

FOREIGN PATENT DOCUMENTS

| | | |
|---|---|---|
| CN | 1222342 A | 7/1999 |
| CN | 201614046 U | 10/2010 |
| CN | 202005373 U | 10/2011 |

(Continued)

*Primary Examiner* — Robert J Hicks
(74) *Attorney, Agent, or Firm* — Johnson, Marcou, Isaacs & Nix, LLC (57) ABSTRACT

A drinking bottle includes a first bottle part (10) having an interior (100) for receiving a beverage (G) and a second bottle part (11) having an interior (110) for receiving the beverage (G) and having a bottle opening (13) for dispensing the beverage (G) from the interior (110), wherein the interiors (100, 110) of the two bottle parts (10, 11) are or can be brought into fluid communication with each other. The drinking bottle (1A-1D) has at least one configuration in which the two bottle parts (10, 11) are inclined to each other. The invention also relates to a valve for a drinking bottle. In this way, a drinking bottle can be provided which allows a user to drink in a particularly comfortable position.

17 Claims, 9 Drawing Sheets

(56) References Cited

U.S. PATENT DOCUMENTS

2015/0144584 A1     5/2015    Renz et al.

FOREIGN PATENT DOCUMENTS

| | | |
|---|---|---|
| CN | 203793848 U | 8/2014 |
| CN | 205366353 U | 7/2016 |
| CN | 105939698 A | 9/2016 |
| CN | 106608447 A | 5/2017 |
| DE | 202013011600 U1 | 2/2014 |
| EP | 891762 A2 | 1/1999 |
| KR | 1998025702 U | 8/1998 |
| KR | 20090003800 U | 4/2009 |

DRINKING BOTTLE AND VALVE THEREFOR

CROSS REFERENCE TO RELATED APPLICATIONS

The instant application should be granted the priority dates of Aug. 9, 2018, the filing date of the International Patent Application PCT/EP2018/071645 and Aug. 10, 2017, the filing date of German application DE 10 2017 213 976.5.

BACKGROUND OF THE INVENTION

The invention relates to a drinking bottle and a valve for a drinking bottle.

Drinking bottles usually have a bottle body with an interior for holding a beverage, which can be dispensed through a drinking spout, for example. Especially when travelling or doing sports, it is common practice to place the drinking spout directly at the mouth to drink from the bottle. The person drinking lifts a bottom of the drinking bottle so far that the beverage can flow through the drinking spout. Here the drinking person tilts the head back to the neck. The further the drink in the bottle is tipped, the steeper the angle to which the bottle must be lifted, resulting in a drinking posture with the head tilted further and further back. Such a drinking posture is not only uncomfortable, because the further back the head is tilted, the more uncomfortable it becomes to swallow. Such a drinking posture can also be dangerous, for example when a cyclist who drinks while riding can only see the road out of the corner of his eye.

SUMMARY OF THE INVENTION

It is an object to provide a drinking bottle that allows a user to drink in a particularly comfortable position.

Correspondingly, the drinking bottle comprises a first bottle part and a second bottle part. Both bottle parts each comprise an interior, the interior being designed to receive and store a liquid, namely a beverage. The second bottle part also includes a bottle opening. The bottle opening is designed to deliver the drink to a user of the drinking bottle. The bottle opening is or includes e.g. a drinking opening, especially a drinking spout. It is provided that the interiors of the two bottle parts are or can be brought into fluid communication with each other. The beverage can thus flow from one of the two bottle parts to the other of the two bottle parts and vice versa. It is provided that the drinking bottle has at least one configuration in which the two bottle parts extend and/or arranged inclined and/or angled with respect to one another. In particular, an axis of symmetry of the first bottle part can be aligned inclined to an axis of symmetry of the second bottle part. For example, the bottle opening is arranged coaxially to the axis of symmetry of the second bottle part.

The inclined alignment of the bottle parts to each other makes it possible to hold the drink particularly comfortably, because while the second bottle part with the bottle opening is held to the mouth at a pleasantly flat angle, the first bottle part can be held upright at a steeper angle so that the beverage can be dispensed quickly.

The two bottle parts can be separate pieces of material or, alternatively, they can be made in one piece.

The drinking bottle may have an upright configuration in which the two bottle parts are arranged upright, in particular not inclined to each other. It may be provided that the two bottle parts are in fluid communication with each other in both configurations (the inclined and the upright), in particular that the two bottle parts are always in fluid communication with each other.

The drinking bottle preferably comprises a rotating or swiveling connection between the bottle parts, by which the two bottle parts can be rotated or swiveled relative to each other about an axis of rotation. It is provided that the axis of rotation is arranged inclined with respect to at least one of the two bottle parts, optionally to both bottle parts. Optionally, the first bottle part includes a connector and the second bottle part includes a connector. The interiors of the bottle parts can be in fluid connection with each other via the connectors or can be brought in fluid connection with each other via the connectors. The two bottle parts may be mounted to one another by the connectors.

The inclined orientation of the rotation axis allows the drinking bottle to be rotated from an upright configuration to an angled configuration. In the upright configuration, the two bottle parts are, for example (especially coaxially) aligned with each other. This allows the drinking bottle to be transported and/or stored in the usual way. In the angled configuration, the two bottle parts extend at an angle (greater than 0 degrees and less than 180 degrees) to each other. In the angled configuration, a particularly comfortable drinking posture is possible.

The drinking bottle can be transferred from the upright configuration to the angled configuration by rotating the two bottle parts relative to each other (e.g. by 180 degrees) about the axis of rotation.

The interior of the first bottle part and the interior of the second bottle part together form the volume of the drinking bottle. The interiors of the two bottle parts can be of different sizes or (essentially) the same size. For example, each of the interiors of both bottle parts contributes at least 10%, at least 20% or at least 30% of the capacity of the drinking bottle.

Preferably at least one of the two bottle parts extends lengthwise along a longitudinal axis. Alternatively or additionally, the drinking bottle forms the longitudinal axis in at least one configuration, in particular in the upright configuration. The axis of rotation is oblique to the longitudinal axis.

The angle between the axis of rotation and the longitudinal axis, for example, is between 20 and 60 degrees, particularly between 30 and 40 degrees. This enables angled configurations with a particularly comfortable drinking posture.

The first bottle part comprises a bottom, wherein the smallest distance between the bottom and the bottle opening can be varied by rotating the two bottle parts relative to each other. For example, the smallest distance between the bottom and the bottle opening is maximum in the upright configuration of the drinking bottle and minimum in the angled configuration of the drinking bottle.

At least one of the two bottle parts may be cylindrical at least in one section and have a cylinder axis. The cylinder axis is preferably coaxial to the longitudinal axis and/or defines the longitudinal axis of the respective bottle part. In particular, a circular-cylindrical shape is possible, wherein cylinders with cross-sectional shapes deviating from a circle are also conceivable. The cylindrical shape can be cut at an angle.

The first bottle part may include a roof section on which the connector of the first bottle part is formed. For example, the roof section extends in a plane perpendicular to the axis of rotation. The first bottle part comprises a bottom which may in particular be inclined to the roof section, preferably at the same angle formed between the axis of rotation and the longitudinal axis. The roof section is opposite the bottom. The bottom extends e.g. in a plane perpendicular to the longitudinal axis.

The second bottle part may include a bottom section that extends adjacent and parallel to the roof section of the first bottle part. The bottom section can be supported by the roof section.

The swivel or rotary connection can be formed by the connectors of the two bottle parts. The connectors can thus provide both the fluid connection and the swivel or rotary connection.

The two connectors together optionally form a screw connection. This allows for easy assembly of the water bottle as well as safe rotation and mounting.

The bottle opening is preferably sealed liquid-tight by means of a bottle closure.

A valve serving as a bottle closure is arranged at the bottle opening in a variant of the drinking bottle. The valve comprises, for example, a base connected or connectable to the drinking bottle, a pin projecting from the base, the diameter of which (perpendicular to a longitudinal direction of extension of the pin) increases from the base towards an end of the pin remote from the base up to an end diameter, in particular at least in sections continuously. The valve further comprises a closure plate which is movable in relation to the pin and which has an opening with an opening diameter. The opening diameter is smaller or equal to the end diameter of the pin. The valve further comprises a resilient element which is supported at or near the base and biases the closure plate with a spring force into a closed position in which the opening is closed by the pin in such a way that the beverage in the bottle cannot escape from the valve. It is provided that the closure plate can be moved out of the closing position against the spring force of the resilient element into an open position in which the opening of the closure plate is at least partially cleared. The cleared opening cross section corresponds to the cross section of the opening of the closure plate minus the cross section of the pin at the location of the closure plate.

This valve enables a particularly comfortable dispensing of the beverage from the drinking bottle by placing the valve at the mouth. In particular, one-handed handling is possible by placing the drinking bottle with the valve against the mouth and simply pressing it against the mouth to dispense the beverage. The valve can serve as a drinking spout.

Unlike standard drinking spouts, this valve allows no unwanted leakage of beverage from the drinking bottle when the drinking bottle is turned and held in the turned position with the bottom of the bottle higher than the bottle opening.

The valve optionally comprises an outer ring which surrounds the pin from the outside in a circumferential direction, the pin projecting beyond the outer ring in the axial direction of the pin. For example, the outer ring and the pin are aligned coaxially with each other. The outer ring protects the resilient element and can provide a stop for the open position.

Optionally, the valve includes a hose which surrounds the pin, in particular, accommodates it, and extends through the opening of the closure plate. This hose can serve as a drinking hose and make it easier for a user to drink from the drinking bottle. The hose is flexible, for example. It may be provided that the closure plate presses the hose against the pin in the closed position so that the drinking bottle is sealed liquid-tight.

The object is also solved by a valve for a drinking bottle. Such a valve for a drinking bottle, in particular for a drinking bottle of any design described herein, comprises a base connected or connectable to the drinking bottle, a pin projecting from the base, the diameter of which increases (in particular at least in sections continuously) towards an end of the pin remote from the base up to an end diameter, a closure plate which is movable relative to the pin and has an opening with an opening diameter which is smaller than or equal to the end diameter of the pin, and a resilient element which is supported on the base and pretensions the closure plate with a spring force into a closed position in which the opening is closed by the pin. The closure plate can be moved out of the closing position against the spring force of the spring-elastic element into an open position, in which the opening of the closure plate is at least partially cleared.

This valve enables a particularly comfortable dispensing of the beverage from the drinking bottle by placing the valve at the mouth. In particular, one-handed handling is possible by placing the drinking bottle with the valve against the mouth and simply pressing it against the mouth to dispense the beverage.

The valve can be designed as described above in connection with the drinking bottle.

BRIEF DESCRIPTION OF THE DRAWINGS

The invention will be explained in more detail in the following with reference to the figures by means of embodiments. It show in schematic representations.

DETAILED DESCRIPTION OF SPECIFIC EMBODIMENTS

Figure 1A:
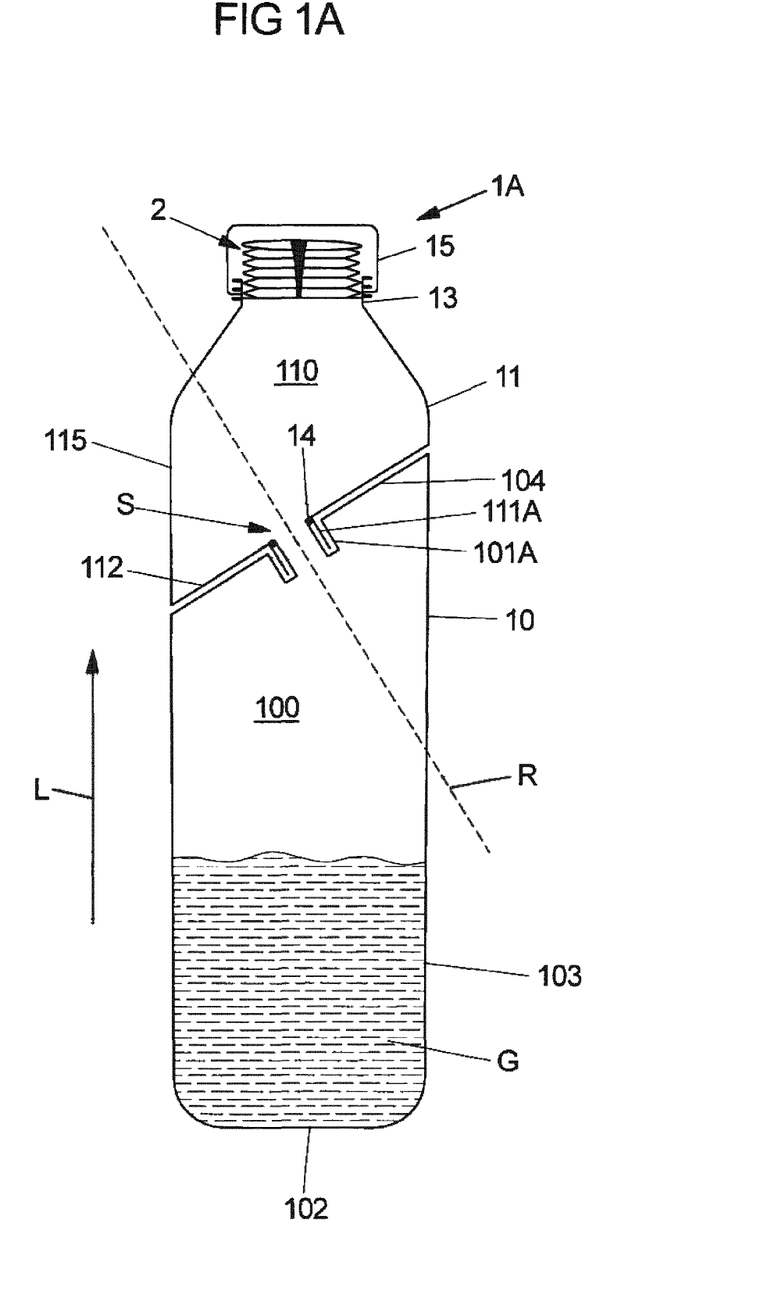
FIG. 1A-1C different views of an embodiment of a drinking bottle with two bottle parts that can be rotated relative to each other with a screw connection.

FIG. 1A shows a drinking bottle 1A standing upright with two bottle parts, a lower first bottle part 10 and an upper second bottle part 11. The drinking bottle 1A is serves to store and deliver a beverage G to a user.

On the first bottle part 10 a bottom 102 of the drinking bottle 1A is formed. On the second bottle part 11 a bottle opening 13 of the drinking bottle 1A is formed. In the configuration shown in FIG. 1A, the bottom 102 and bottle opening 13 are located at opposite longitudinal ends of the drinking bottle 1A.

The first bottle part 10 comprises a surrounding wall 103. Together with the bottom 102 and a roof section 104 opposite the bottom 102, the wall 103 defines an interior 100. The interior 100 is designed to contain a liquid, in this case the beverage G.

The second bottle part 11 also comprises a circumferential wall 115. The wall 115 and the bottle opening 13 together with a bottom section 112 opposite the bottle opening 13 define a further interior 110. The bottle opening 13 is closed by a valve 2. Valve 2 serves as a drinking spout and can be opened by the user of the drinking bottle 1A. Valve 2 is protected by a cover 15 which covers valve 2.

The walls 103, 115 of the two bottle parts 10, 11 are essentially cylindrical, presently circular-cylindrical, although other shapes are also conceivable. In the configuration shown in FIG. 1A, the cylinder axes of the two cylinder sections 10, 11 are coaxial.

Each of the two bottle parts 10, 11 comprises a connector 101A, 111A, presently each with a thread. The thread of connector 101A of the first bottle part 10 engages with the thread of connector 111A of the second bottle part 11. Both connectors 101A, 111A are in the form of a bushing, one of the two connectors 101A, 111A (in this case that of the second bottle part 11) being received by the other connector 101A, 111A.

The two interiors 100, 110 of the bottle parts 10, 11 are in fluid connection with each other through the connectors 101A, 111A, so that with the respective inclination of the drinking bottle 1A the beverage G can flow from the first to the second bottle part 10, 11 and vice versa. A seal 14 arranged (circumferentially) between the connectors 101A, 111A prevents unintentional leakage of the beverage at the connectors 101A, 111A.

If the user holds the drinking bottle 1A in such a way that the bottom 102 is significantly higher than the bottle opening 13, the beverage can be dispensed from the drinking bottle 1A with valve 2 open. In the configuration shown in FIG. 1A, this can lead to an uncomfortable drinking posture with the head thrown far back into the neck, especially when the beverage G is running low.

For this reason, the drinking bottle 1A has a swivel connection S. The swivel connection S is formed by the two connectors 101A, 111A of the bottle parts 10, 11, specifically by their threads engaging one another. By means of the swivel connection S, the two bottle parts 10, 11 can be rotated relative to each other. The rotation is performed with respect to an axis of rotation R, which is defined by the arrangement of the connectors 101A, 111A.

The axis of rotation R is inclined to both bottle parts 10, 11. This allows the drinking bottle 1A to be swiveled from its upright configuration shown in FIG. 1A to an angled configuration, as explained further below.

The connectors 101A, 111A are each formed on the roof section 104 and the bottom section 112, respectively, of the two bottle parts 10, 11, in the present example in each case in the middle of the roof section 104 and the bottom section 112, respectively. The roof section 104 and the bottom section 112 extend approximately parallel to each other. Specifically, both the roof section 104 and the bottom section 112 are essentially flat.

The connectors 101A, 111A each extend in a direction perpendicular to the plane of the roof section 104 and the bottom section 112, respectively, and in particular project therefrom perpendicularly.

The roof section 104 and the bottom section 112 are arranged inclined on the first and second bottle parts 10, 11 respectively. The bottom section 112 extends in a plane which is inclined (e.g. at an angle of 25 to 35 degrees, in particular about 30 degrees) to the cylinder axis of the first bottle part 10. The roof section 104 extends in a plane which is inclined to the cylinder axis of the second bottle part 11 (in particular at the same angle as the roof section 104 to the cylinder axis of the first bottle part 10).

The axis of rotation R runs perpendicular to the top section 104 and to the bottom section 112. Thus the axis of rotation R extends obliquely to the cylinder axis of the first and of the second bottle part 10, 11. In the present case the axis of rotation R runs obliquely to a longitudinal axis L of the first bottle part 10. The longitudinal axis L extends longitudinally along the longitudinal extension direction of the first bottle part 10 (and/or coaxially to its cylinder axis).

Figure 1B:
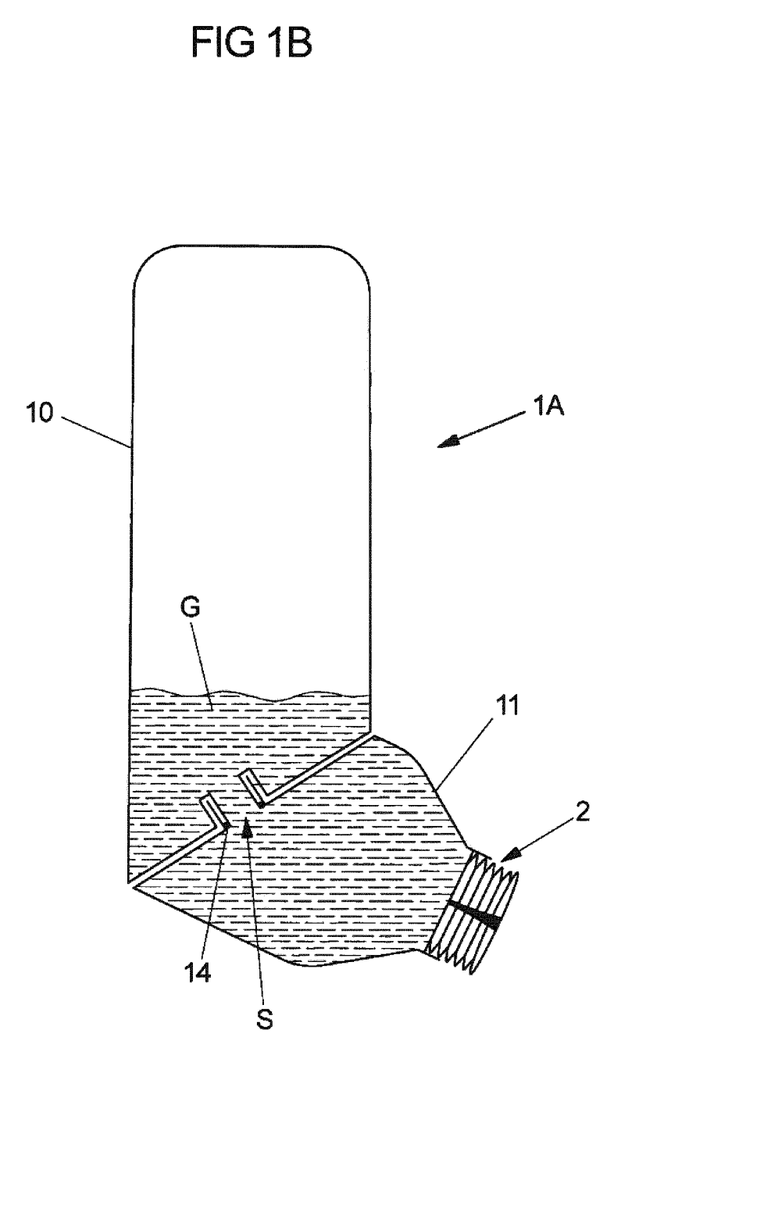

FIG. 1B shows the angled configuration of drinking bottle 1A. Compared to the upright configuration shown in FIG. 1A, the two bottle parts 10, 11 are pivoted by about 180 degrees to each other. Due to the inclined course of the axis of rotation R, the cylinder axes of the two bottle parts 10, 11 are at an angle to each other. If the user holds the drinking bottle 1A to the mouth in this angled configuration, a much more comfortable drinking posture is possible, with the head held comparatively upright. Here the user holds the first bottle part 10 at a steeper angle to the horizontal than the second bottle part 11.

The drinking bottle 1A thus has an upright configuration and an angled configuration. In the angled configuration, the distance between the bottom 102 and the bottle opening 13 is smaller than in the upright configuration.

Figure 1C:
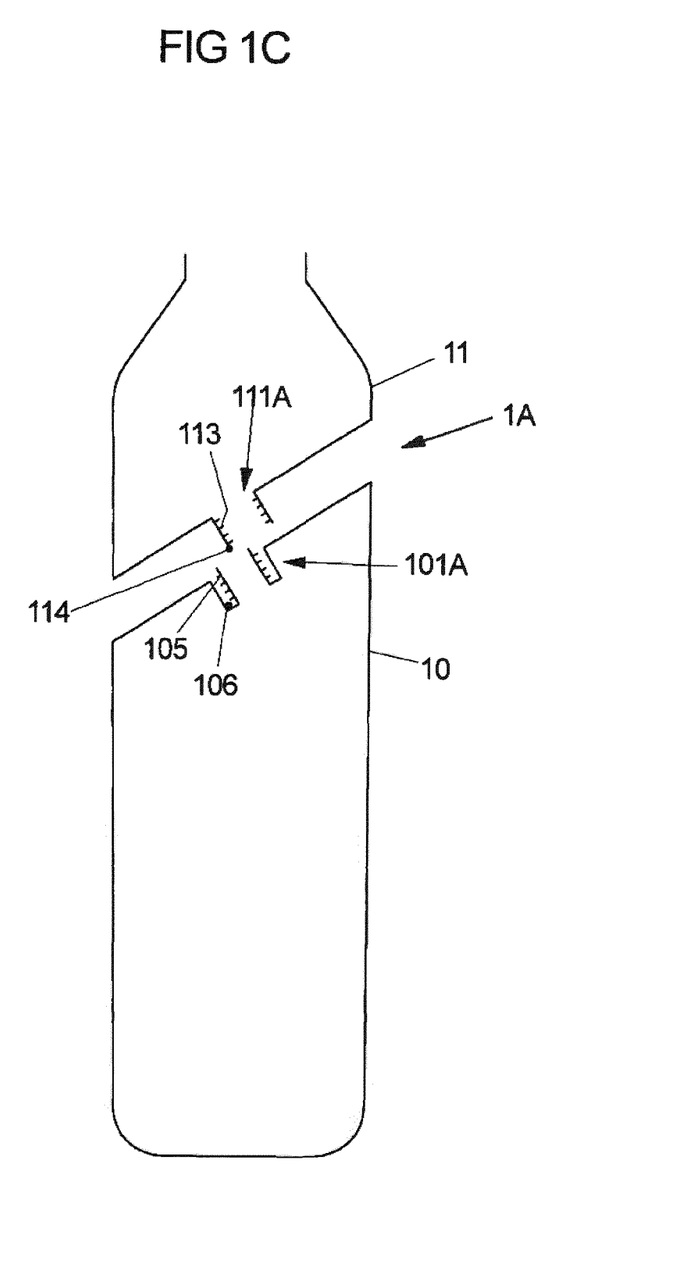

FIG. 1C shows the two bottle parts 10, 11 in an unscrewed state. Here it can be seen that the thread 105 of the first bottle part is designed as an external thread and the thread 113 of the second bottle part 11 is designed as an internal thread. Furthermore, FIG. 1C shows a stop 106 which is provided on the connector 101A of the first bottle part 10 and which cooperates with a counter stop 114 (or several counter stops arranged offset to each other in the direction of rotation) on the connector 111A of the second bottle part 11. The stop 106 and the counter stop 114 limit the maximum angle of rotation of the bottle parts to each other (e.g. to about 180 degrees). This prevents the bottle parts 10, 11 from accidentally coming loose from each other.

At least one of the two bottle parts 10, 11 is made in one piece. Preferably, both bottle parts 10, 11 are designed in one piece each.

Figure 2A:
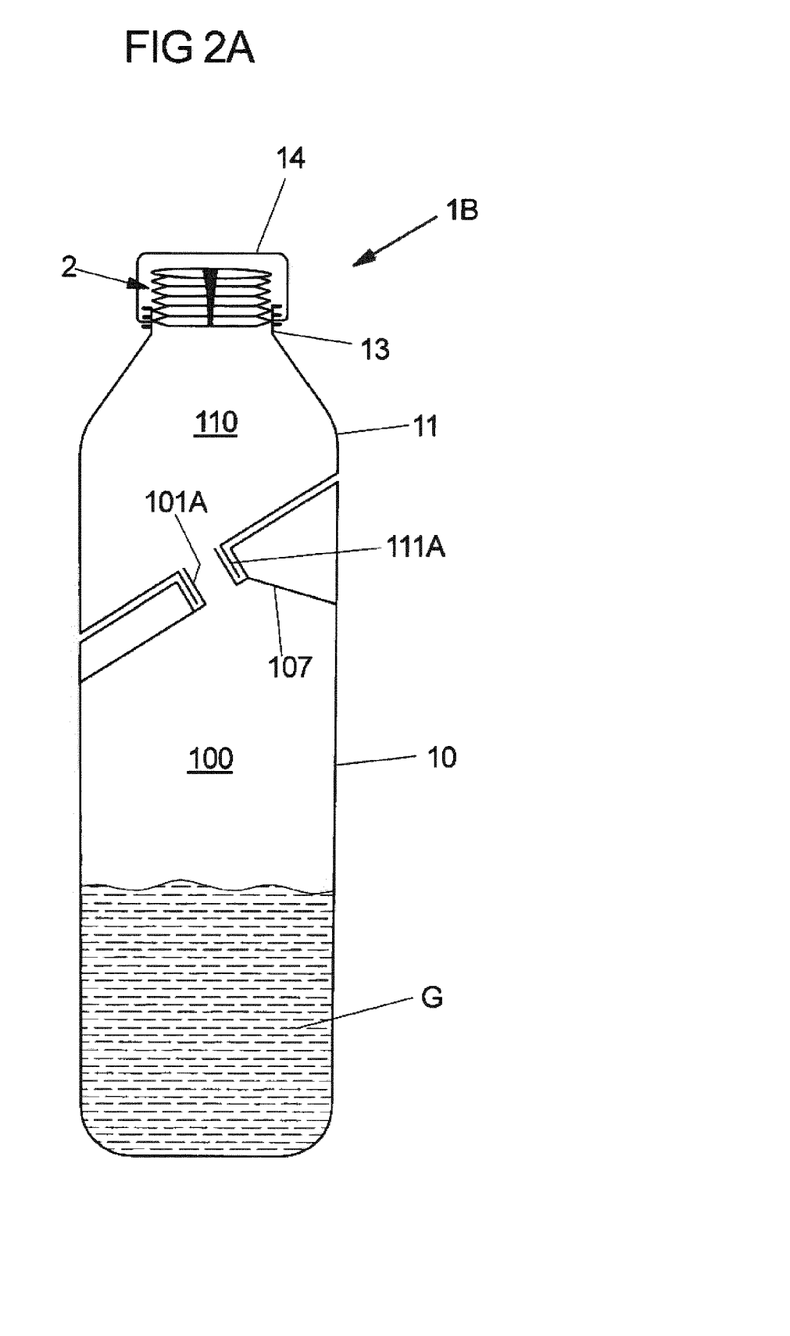
FIG. 2A-2B different views of an embodiment of a drinking bottle with two bottle parts that can be rotated relative to each other and with a funnel.
Figure 2B:
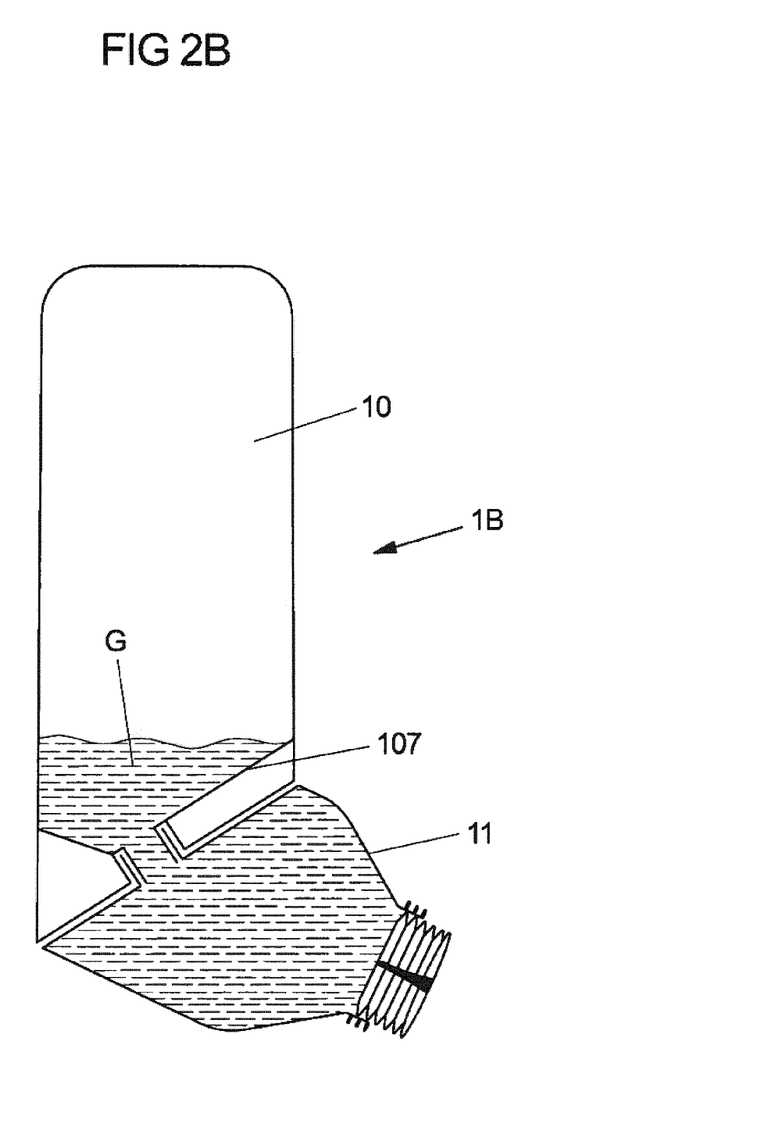

FIGS. 2A and 2B show a drinking bottle 1B, which is similar to the drinking bottle according to FIG. 1A-1C. The drinking bottle 1B as shown in FIGS. 2A (upright configuration) and 2B (angled configuration) additionally includes an inner wall 107, which prevents part of the beverage G from remaining in the first bottle part 10 when dispensing in the angled configuration (see FIG. 2B). Here, the inner wall 107 is funnel-shaped.

As shown in FIGS. 2A and 2B, the connectors 101A, 111A extend from the roof section 104 and bottom section 112, respectively, into the interior 100 of the first bottle part 10. The inner wall 107 is fixedly connected to the connector 101A of the first bottle part at an end facing away from the roof section 104 and extends from there circumferentially to the wall 103 of the first bottle part 10.

Figure 3:
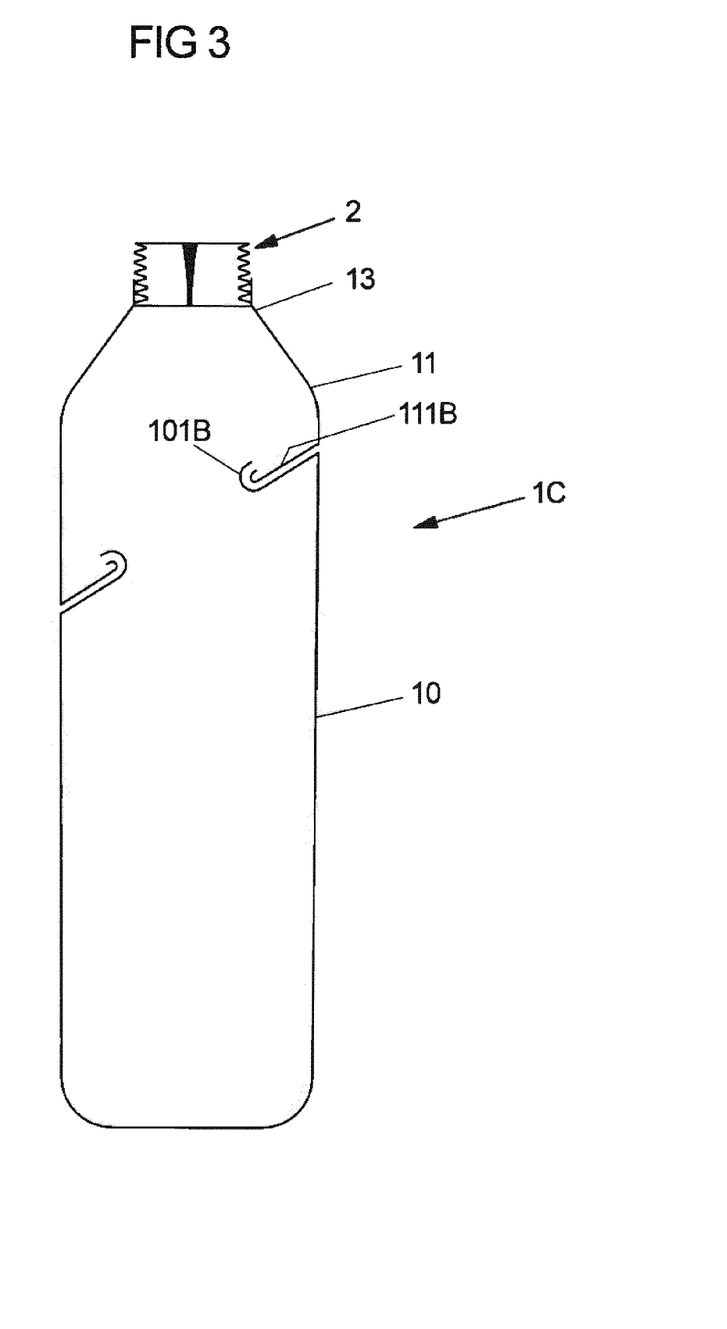
FIG. 3 an embodiment of a drinking bottle with two bottle parts that are rotatable relative to each other and with a snap-in connection.

FIG. 3 shows another drinking bottle 1C, which is similar to the drinking bottle shown in FIG. 1A-1C. Compared to this, however, it includes differently designed connectors 101B, 111B. The connectors 101B, 111B of the first and second bottle parts 10, 11 according to FIG. 3 are designed in the form of a snap-in connection. For assembly, the two connectors 101B, 111B are snapped together. This enables a simple and at the same time secure connection. Inside the connectors 101B, 111B, as with the connectors 101A, 111A according to FIG. 1A-2B, an opening is formed through which the interiors 100, 110 of the bottle parts 10, 11 are connected to each other. The diameter of the opening of the drinking bottle 1C according to FIG. 3 is in one direction more than 80%, in particular more than 90% of the diameter of the first bottle part 10 and/or the second bottle part 11. A correspondingly large opening is also possible for the drinking bottles 1A-1B according to FIG. 1A-2B.

Figure 4:
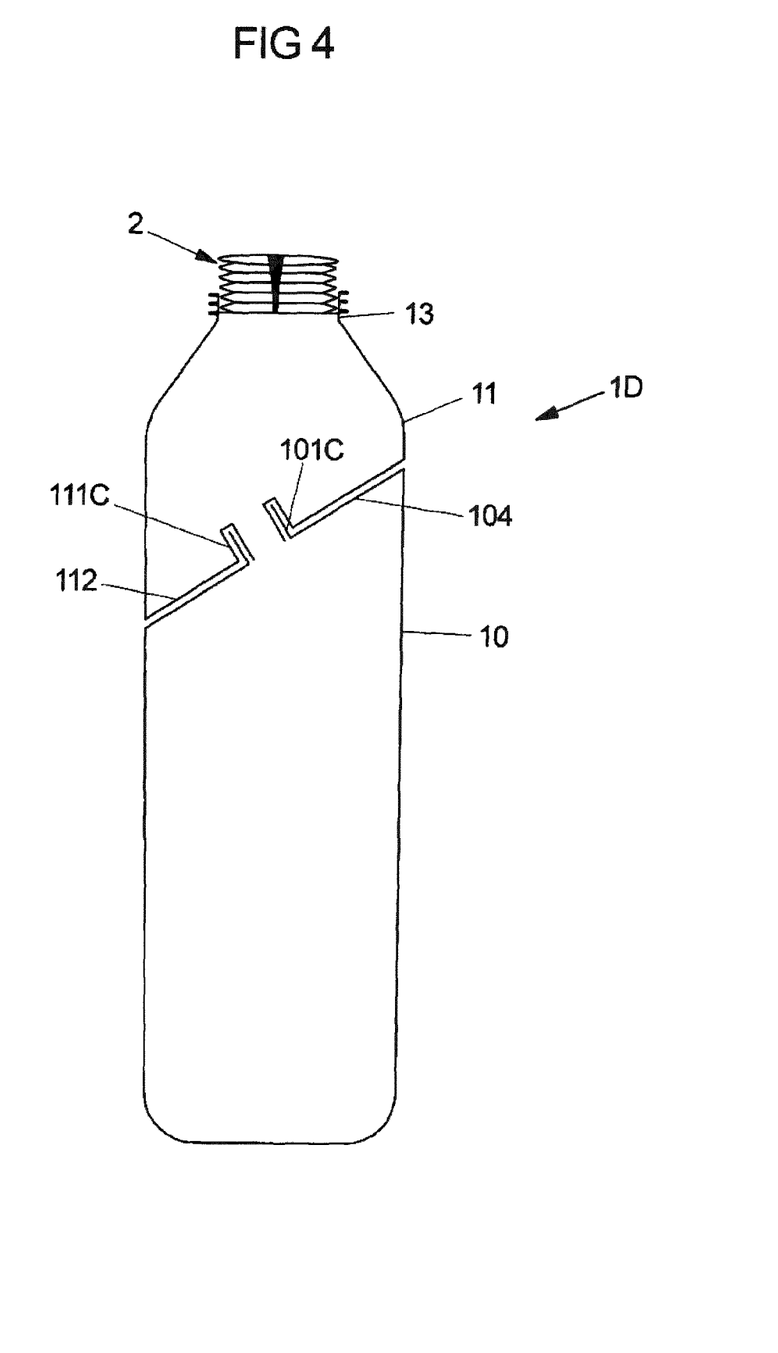
FIG. 4 an embodiment of a drinking bottle with two bottle parts that can be rotated relative to each other with a screw connection that extends into an interior of one of the bottle parts in the direction of a bottle opening.

FIG. 4 shows another drinking bottle 1D, which is similar to the drinking bottle shown in FIG. 1A-1C. The only difference is that the connectors 101C, 111C of the drinking bottle 1D as shown in FIG. 4 extend from the roof section 104 and from the bottom section 102 into the interior of the second bottle part 11. This allows to largely avoid that in the angled configuration parts of the beverage G are retained by the connectors 101C, 111C in the first bottle part 10.

Figure 5A:
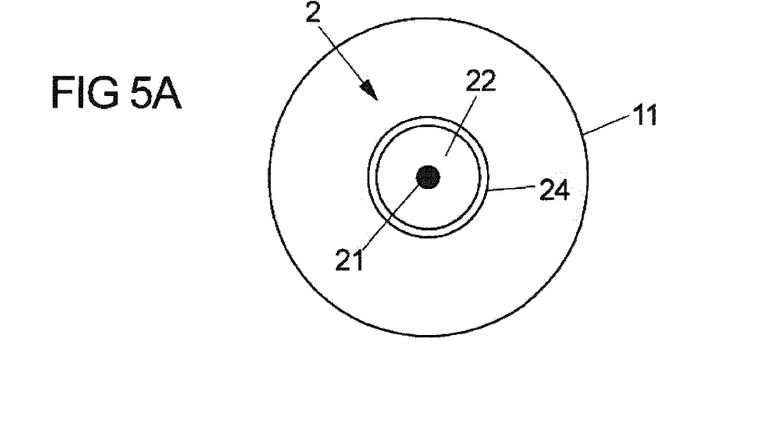
FIG. 5A-5C different views of a valve of the drinking bottles according to FIGS. 1A-4.
Figure 5B:
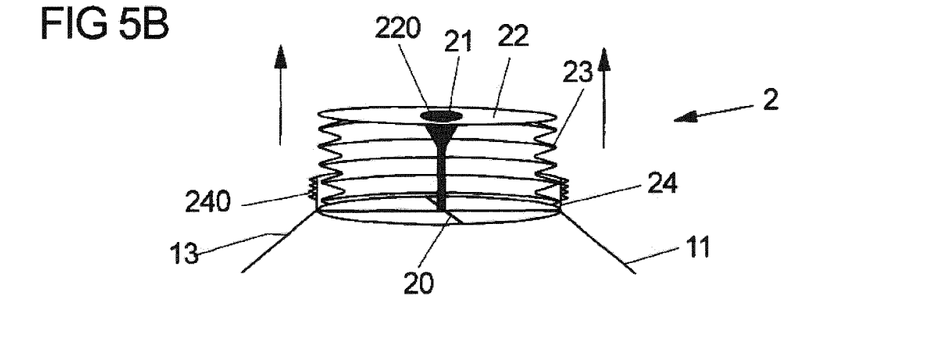
Figure 5C:
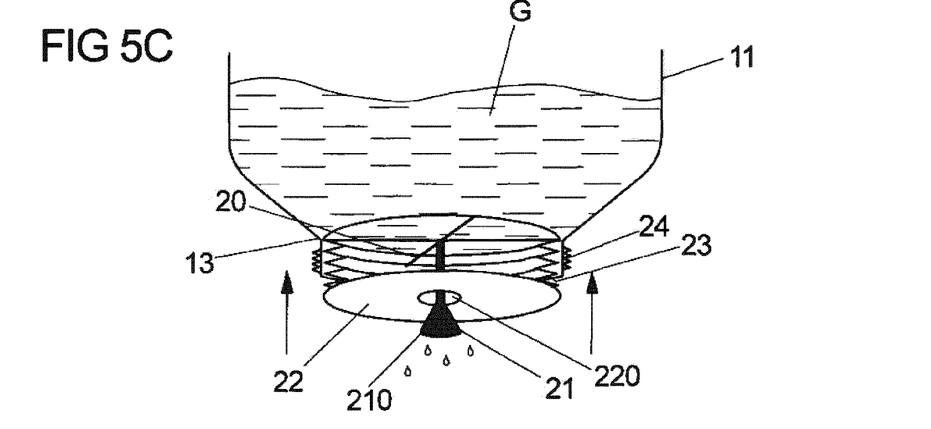

FIG. 5A-5C shows more details of the aforementioned valve 2 of the drinking bottles 1A-1D as shown in FIG. 1A-4. Therein, FIG. 5A shows a top view of the valve and the second bottle part 11 of the drinking bottle 1A-1D. FIG. 5B shows a partially cut open view from the side and FIG. 5C shows a use position, also in a partially cut open side view.

Valve 2 comprises a base 20, which in the example shown is formed by a cross of webs. The base 20 is fixedly connectable or connected to the second bottle part 11, e.g. it is formed as one piece with it. The base 20 is located inside the bottle opening 13.

Starting from the base 20, a pin 21 extends away from the interior 110 of the second bottle part 11. Here, the pin 21 is fixed at the crossing point of the webs of the base 20, e.g. formed in one piece therewith. The pin 21 widens from base 20 towards an end 210 opposite base 20, in this case continuously in a section adjacent to end 210. The pin 21 is elongated. Optionally, the pin 21 can be continuously widened over its entire length.

Valve 2 further comprises a spring-elastic element in the form of a bellows 23, which is (completely) circumferentially and tightly connected to the edge of the bottle opening 13, so that no beverage G can escape between bellows 23 and bottle opening 13. At an end of the bellows opposite to the base 20, a closure plate 22 is connected to the bellows (fully circumferential). The connection is tight and circumferential. In this example, the closure plate 22 is designed in the form of a circular disc. The closure plate 22 has an opening 220, which is located in the center of the closure plate 22. The opening 220 is smaller or at most the same size as the pin 21 in the area of its end 220 (and has approximately the same cross-sectional shape). The opening 220 and the pin 21 are coaxially aligned.

As shown in FIG. 5B, the bellows 23 presses the closure plate 22 resiliently (along the arrows) against the pin 21. Therein, the edge of the opening 220 of the closure plate 22 is pressed against the pin 21. The opening 220 of the closure plate 22 is closed liquid-tight by the equally sized or (slightly) larger pin 21 at its end 210.

Valve 2 can be moved from the closed position shown in FIG. 5B to an open position by moving the closure plate 22 against the spring force of the bellows 23 (generally the resilient element) towards the base 20 (indicated by arrows in FIG. 5C). This can be done, for example, by placing the drinking bottle 1A-1D on the user's mouth, which particularly is possible with one hand. Therein, folds of bellows 23 are pressed closer together. If no external force is applied to the closure plate 22, the bellows 23 automatically moves it from the open position to the closed position. The folds of bellows 23 widen therein.

This prevents unintentional leakage of beverage G when turning and holding the drinking bottle 1A-1D with the bottle opening 13 facing downwards. Beverage G is only dispensed when valve 2 is placed against the mouth.

FIG. 5C shows valve 2 in the open position. Since the pin 21 has a smaller diameter towards the base 20 than at its end 210, the pin no longer completely closes the opening of the closure plate 22. Beverage G can now be dispensed through the partially opened opening 220.

To protect parts of valve 2, an outer ring 24 is provided which surrounds bellows 23 on the outside. The outer ring 24 is also provided with a thread 240 or the like for the cover 15. The pin 21 projects beyond the outer ring 24 along the longitudinal direction of the pin 21 in the direction away from base 20. The outer ring 24 optionally serves as a stop for the closure plate 22 when the closure plate 22 is moved from the closing position to the opening position.

Figure 6A:
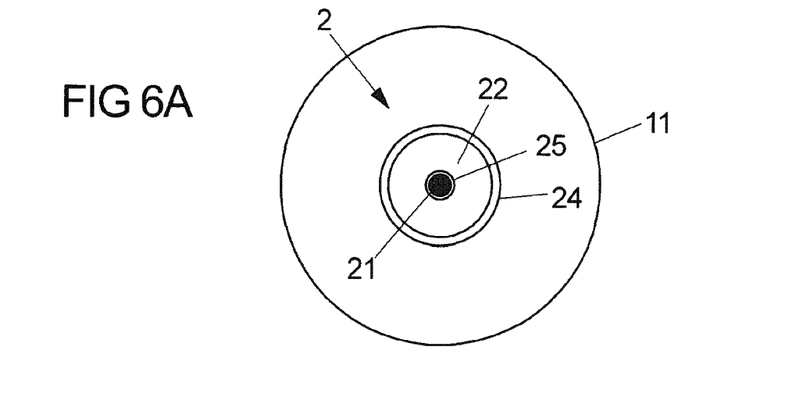
FIG. 6A-6C different views of a valve of the drinking bottles according to FIG. 1A-4 with an additional hose.
Figure 6B:
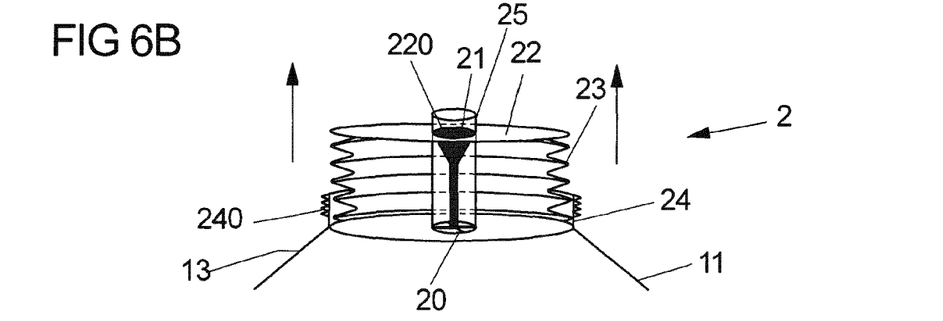
Figure 6C:
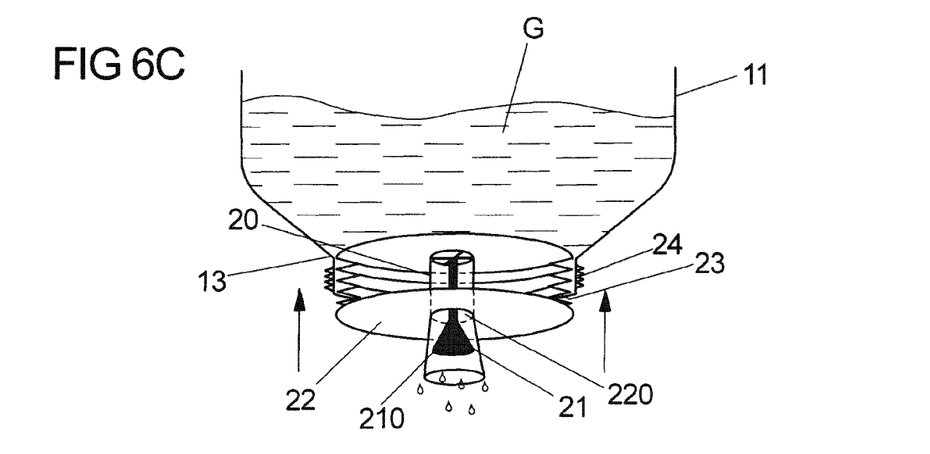

According to FIG. 6A-6C, valve 2 is additionally provided with a hose 25. The hose 25 receives the pin 21 inside. The hose 25 extends from the base 20 through the opening 220 of the closure plate 22 (both in the closed position and in the open position.

The hose 25 is flexible (e.g. made of silicone or similar). In the closed position (see in particular FIG. 6B) the closure plate 22 compresses the hose 25 and presses it against the pin 21. The hose seals the closure plate 22 against the pin 21.

In the open position (see in particular FIG. 6C) the closure plate 22 does not press the hose 25 against the pin 21. The free end of the hose 25 is thus not compressed and is widened due to the elasticity of the hose 25 (compared to the closed position). This creates a gap between the pin 21 and the hose 25, through which the beverage G can be dispensed. The hose 25 is a drinking hose.

Optionally, base 20 is closed outside tube 25 to facilitate cleaning of the drinking bottle.

The specification incorporates by reference the disclosures of PCT/EP2018/071645, filed Aug. 9, 2018, and DE 10 2017 213 976.5, filed Aug. 10, 2017.

The present invention is, of course, in no way restricted to the specific disclosure of the specification and drawings, but also encompasses any modifications within the scope of the appended claims.

LIST OF REFERENCE SIGNS 1A-1D drinking bottle
10 first bottle part
100 interior
101A-101C connector
102 bottom
103 wall
104 roof section
105 thread
106 stop
107 inside wall
11 second bottle part
110 interior
111A-111C connector
112 bottom section
113 thread
114 counter stop
115 wall
13 bottle opening
14 gasket
15 cover
2 valve
20 base
21 pin
210 end
22 closure plate
220 opening
23 bellows (resilient element)
24 outer ring 25 hose
240 thread
S swivel connection
G drink
L longitudinal axis
R axis of rotation

The invention claimed is:

1. A drinking bottle, comprising:
   a first bottle part (10) having a first interior (100) for receiving a beverage (G); and
   a second bottle part (11) having a second interior (110) for receiving the beverage (G) and having a bottle opening (13) for dispensing the beverage (G) from the second interior (110),
   wherein the first and second interiors (100, 110) of the first and second bottle parts (10, 11), respectively, are or can be brought into fluid communication with each other, and wherein the drinking bottle (1A-1D) has at least one first configuration in which the two bottle parts (10, 11) are inclined relative to each other.

2. The drinking bottle according to claim 1, wherein the drinking bottle (1A-1D) has a second, upright configuration, wherein the first and second bottle parts (10, 11) are in fluid communication with each other in both the at least one first configuration and in the second configuration.

3. The drinking bottle according to claim 1, wherein the first bottle part (10) comprises a first connector (101A-101C) and the second bottle part (11) comprises a second connector (111A-111C), wherein the first interior (100) and the second interior (110) are in fluid communication with each other via the first and second connectors (101A-101C, 111A-111C) of the first and second bottle parts (10, 11), respectively.

4. The drinking bottle according to claim 3, wherein the first and second bottle parts (10, 11) are mounted to one other by the connectors (101A-101C, 111A-111C).

5. The drinking bottle according to claim 3, further comprising a swivel connection (S), wherein the first and second bottle parts (10, 11) are pivotable relative to one another about an axis of rotation (R) via the swivel connection (S), the axis of rotation (R) extending obliquely to at least one of the first and second bottle parts (10, 11).

6. The drinking bottle according to claim 5, wherein the axis of rotation (R) is inclined to a longitudinal axis (L) of at least one of the first and second bottle parts (10, 11).

7. The drinking bottle according to claim 6, wherein the angle between the axis of rotation (R) and the longitudinal axis (L) is between 20 and 60 degrees.

8. The drinking bottle according to claim 7, wherein the angle between the axis of rotation (R) and the longitudinal axis (L) is between 30 and 40 degrees.

9. The drinking bottle according to claim 5, wherein the connectors (101A-101C, 111A-111C) of the first and second bottle parts (10, 11) together form the swivel connection (S).

10. The drinking bottle according to claim 3, wherein the first bottle part (10) comprises a roof portion (104) on which the connector (101A-101C) of the first bottle part (10) is formed, wherein the roof portion (104) extends inclined with respect to a bottom (102) of the first bottle part (10).

11. The drinking bottle according to claim 10, wherein the second bottle part (11) comprises a bottom section (112) extending adjacent and parallel to the top portion (104) of the first bottle part (10).

12. The drinking bottle according to claim 3, wherein the two connectors (101A-101C, 111A-111C) form a screw connection.

13. The drinking bottle according to acclaim 1, wherein the first bottle part (10) comprises a bottom (102), wherein the smallest distance between the bottom (102) and the bottle opening (13) is variable by pivoting the first and second bottle parts (10, 11) relative to each other.

14. The drinking bottle according to claim 1, wherein at least one of the first and second bottle parts (10, 11) is formed cylindrically with a cylinder axis at least in sections, the cylinder axis extending coaxially to a longitudinal axis (L) of at least one of the first and second bottle parts (10, 11).

15. The drinking bottle according to claim 1, further comprising a valve (2) arranged at the bottle opening (13), the valve comprising:
   a base (20) connected or connectable to the drinking bottle (1A-1D);
   a pin (21) projecting from the base (20), wherein a diameter of the pin (21) increases towards an end (210) of the pin (21) facing away from the base (20) up to an end diameter;
   a closure plate (22) having an opening (220) with an opening diameter smaller than or equal to the end diameter of the pin (21); and
   a resilient element (23) supported on the base (20) and biasing the closure plate (22) with a spring force into a closed position in which the opening (220) is closed by the pin (21),
   wherein the closure plate (22) is moveable out of the closed position against the spring force of the resilient element (23) into an open position in which the opening (220) of the closure plate (22) is at least partially exposed.

16. The drinking bottle according to claim 15, further comprising an outer ring (24) surrounding the pin (21), the pin (21) projecting beyond the outer ring (24).

17. The drinking bottle according to claim 15, further comprising a hose (25) surrounding the pin (21) and extending through the opening (220) of the closure plate (22).

* * * * *

UNITED STATES PATENT AND TRADEMARK OFFICE
CERTIFICATE OF CORRECTION

Page 1 of 1

PATENT NO. : 11,208,234 B2
APPLICATION NO. : 16/637682
DATED : December 28, 2021
INVENTOR(S) : Maura Oerding It is certified that error appears in the above-identified patent and that said Letters Patent is hereby corrected as shown below:

In the Claims

Column 10
Line 15, Claim 13 "The drinking bottle according to acclaim 1" should read --The drinking bottle according to claim 1--

Column 10
Line 17, Claim 13 "the smallest distance" should read --a smallest distance--

Signed and Sealed this
First Day of March, 2022

Drew Hirshfeld
*Performing the Functions and Duties of the*
*Under Secretary of Commerce for Intellectual Property and*
*Director of the United States Patent and Trademark Office*